United States Patent [19]
Kellstrom

[11] Patent Number: 4,705,411
[45] Date of Patent: Nov. 10, 1987

[54] RADIAL ROLLING BEARING

[75] Inventor: Magnus Kellstrom, Partille, Sweden

[73] Assignee: Aktiebolaget SKF, Gothenburg, Sweden

[21] Appl. No.: 940,584

[22] Filed: Dec. 11, 1986

Related U.S. Application Data

[63] Continuation-in-part of Ser. No. 780,428, Sep. 26, 1985, abandoned.

[30] Foreign Application Priority Data

Sep. 26, 1984 [SE] Sweden .............................. 8404813

[51] Int. Cl.$^4$ ........................ F16C 33/36; F16C 33/58
[52] U.S. Cl. .................................... 384/450; 384/568; 384/569
[58] Field of Search ............... 384/450, 568, 569, 570, 384/548

[56] References Cited

U.S. PATENT DOCUMENTS

| | | | |
|---|---|---|---|
| 3,370,900 | 2/1968 | Messerschmidt | 384/568 |
| 3,966,281 | 6/1976 | Wiegard | 384/568 |
| 4,227,754 | 10/1980 | Kellström | 384/450 |

Primary Examiner—Lenard A. Footland
Attorney, Agent, or Firm—Eugene E. Renz, Jr.

[57] ABSTRACT

A roller bearing comprising an inner and outer raceway and a row of rollers arranged between and contacting the raceways, the axes of the rollers being substantially parallel to the axes of the raceways when the latter are coinciding, the rollers and the raceways having curved longitudinal section profiles in which the curve radii are substantially greater than the greatest distance between the central axis of the bearing and the surfaces of the raceways and wherein the rollers are axially movable between the raceways without being obstructed by axial limitations at the raceways or by limited axial cage play for permitting relative inclination and axial displaceability being limited only by the rollers being squeezed radially between the raceways.

5 Claims, 2 Drawing Figures

RADIAL ROLLING BEARING

This is a continuation-in-part of application bearing Ser. No. 780,428 filed Sept. 26, 1985 entitled RADIAL ROLLING BEARING, now abandoned.

FIELD OF THE INVENTION

The present invention relates to rolling bearings and particularly to a new and improved radial rolling bearing characterized by novel features of construction and arrangement permitting moderate axial displacement and misalignment of the race rings producing reduced friction losses as compared to spherical bearings.

BACKGROUND OF THE INVENTION

U.S. Pat. No. 2,595,121 entitled ANTI-FRICTION BEARING which issued Apr. 29, 1952 shows a bearing with concave rollers and Swedish Patent Publication No. 53,256 shows a bearing with convex rollers.

Even though these patents show bearings which have a superficial resemblance to bearings made in accordance with the present invention, nevertheless, they possess certain disadvantages and drawbacks. For example, these bearings present the disadvantages in that they lack the self-aligning capacity of a spherical roller bearing which capacity is useful in many respects. Furthermore, in the Swedish Patent, it was considered necessary to provide a roller mounting opening on one of the bearing rings identified by the reference numeral 8 in order to permit mounting of a desired number of rollers in the bearing. Such an opening constitutes a complication and limits the usefulness of the bearing since the opening must not be situated in any loaded portion of the bearing. Furthermore, the mounting arrangement for a bearing of the type shown in the United States Patent wherein the rollers are mounted while the rings are eccentrically placed limits the number of rollers and, therefore, the bearing has a comparatively poor load carrying capacity.

SUMMARY OF THE INVENTION

With the foregoing in mind, it is an object of the present invention to provide a bearing which has an improved radial load carrying capacity and is characterized by novel features of construction and arrangement permitting a certain relative inclination and axial displacement of the rollers and raceways and thereby accommodate normal misalignment of the bearing in operation and wherein the friction losses in the bearing are reduced as compared to, for example, spherical roller bearings under similar operating conditions.

Another object of the present invention is to provide a roller bearing wherein the profile radius of the rollers and raceways is substantially greater than the greatest distance between the central axis of the bearing and the raceway surface to provide an improved load carrying capacity and reduced friction losses as compared to a spherical roller bearing of corresponding radial size. The bearing of the present invention also exhibits lower friction losses as compared to spherical roller bearings at normal misalignment angles of about 1° or less.

A further object of the present invention is to provide a bearing assembly wherein the rollers can be assembled without the need for a roller mounting opening and the bearing can be provided with a full complement thereby increasing the load carrying capacity of the bearing.

A further object of the present invention is to provide a roller bearing characterized by novel features of construction and arrangement which minimizes edge loading and thus reduces friction losses in the bearing.

BRIEF DESCRIPTION OF THE DRAWINGS

These and other objects of the present invention and various features and details of the operation and construction thereof are hereinafter more fully set forth with reference to the accompanying drawings, wherein.

DESCRIPTION OF THE PREFERRED EMBODIMENTS

Figure 1:
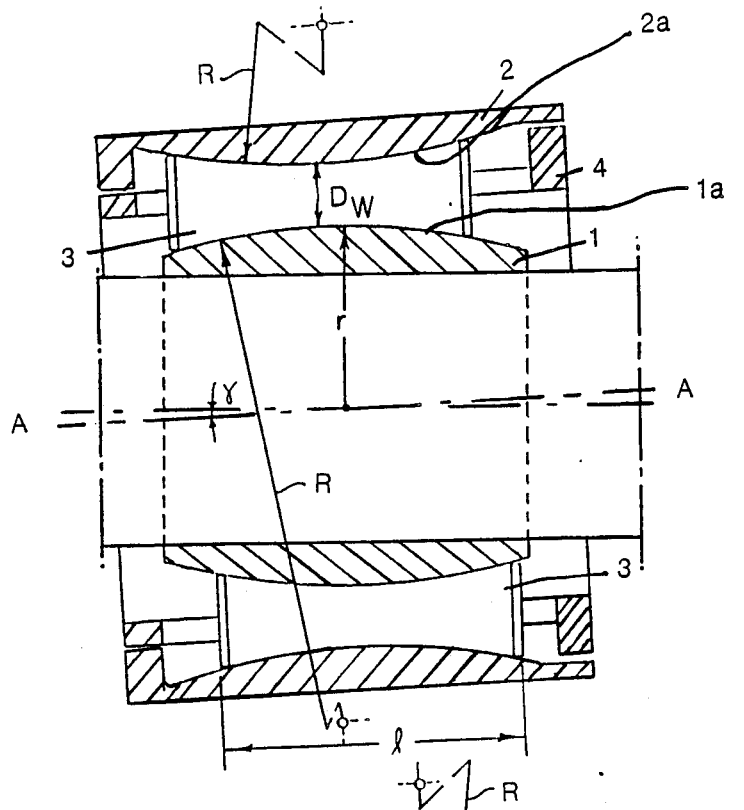
FIG. 1 is a transverse sectional view of a roller bearing in accordance with the present invention.

Referring now to the drawing and particularly to FIG. 1 thereof, there is illustrated one embodiment of roller bearing in accordance with the present invention comprising an inner ring 1 having a convex inner raceway surface 1a and an outer ring having a confronting concave outer raceway surface 2a. A plurality of rollers 3 having concave profiles are mounted in the annular space between the raceways. Each raceway has a convex curved profile in the shape of a circular arc and the envelope or profile surface of the rollers having correspondingly concave longitudinal section profile. The radii of curvature of the rollers and raceways are intended to be equal within the normal tolerances of the industry. The raceway convex profile and the profile surface of the rollers will be manufactured with the same radius R, and, thus, their radii will be equal within the margin of variation permitted by the tolerances of standard manufacturing techniques. Accordingly, the term "equal" as used herein for the radii R means that the radii are in substantial conformity with each other. Because of manufacturing efficiencies which come from design of interchangeable parts, some variation in radii is expected, and is permissible as long as they are functionally the same. In practice, deviations of no more than about 20% deviation in curve radius would be acceptable.

Figure 2:
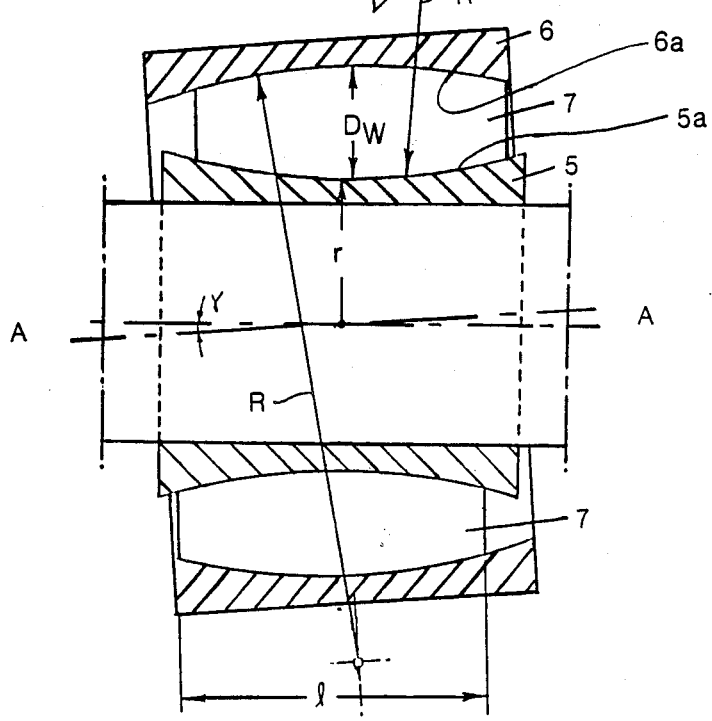
FIG. 2 is a transverse sectional view of another embodiment of a roller bearing in accordance with the present invention.

In accordance with the present invention, the profile radius R of the raceways and roller is preferably considerably greater than the greatest distance, r in FIG. 1 and FIG. 2, between the central axis A—A of the bearing and the raceway surfaces whose center of curvature is closest to the axis of the bearing. R should be at least 2.5 times r, in order to permit a reasonable maximum angle of inclination. Preferably, the value for R will be from 2.5 r to as much as 20 r, as this upper limit of R being 20 r will allow an acceptable inclination angle at minimum friction conditions. The gentle crowning of the surfaces entails that the radial extension of the bearing required for a given roller length is small which, therefore, is space saving and it has been found that the internal friction occurring in the bearing because of sliding of the contact between rollers and raceways is low in comparison to a spherical roller bearing of comparable radial dimension subjected to corresponding load. The profile radius R for obtaining minimum friction in a bearing in accordance with the present invention is determined as follows:

$$R = k\sqrt{\frac{r_m L_a^2}{D_w \cdot \gamma}}$$

wherein $r_m$ is the radius of the bearing axis to the center of the roller, $L_a$ is the roller length, K is a constant of approximately 0.56, and $D_w$ is the smallest diameter of the roller.

The rollers are preferably of a length L in relation to the width of the raceways so that at a misalignment angle or angle of inclination $\gamma$, the rollers are still engaged within the confines of the raceways.

For a bearing of this type, for a given misalignment angle $\gamma$, the roller to outer ring displacement $\Delta_o$ is equal to $$\frac{\gamma}{2}\left[R - r - \frac{D_w(R - r)}{2R + D_w}\right]$$

The displacement of the rollers relative to the inner ring $\Delta_i$ is equal to $$\frac{\gamma}{2}\left[R + r + \frac{D_w(R - r)}{2R + D_w}\right]$$

The axial displacement $\delta_a$ of one bearing ring in relation to the other ring causes displacement of the roller relative to either ring which is equal to $$\frac{\delta_a}{2}\left(1 - \frac{D_w}{2R + D_w}\right)$$

The bearing design permits a certain inclination $\gamma$ of the inner ring in relation to the outer ring. During inclination some rollers are displaced axially. Therefore, the rollers must be allowed to perform axial movement to a sufficient extent. If, for example, a maximum inclination $\gamma$ of ½ degree is to be permitted, then the rollers must be allowed to be displaced about 2 mm in a bearing in which the radius of the pitch circle of the rollers is 50 mm, the smallest diameter of the rollers $D_w$ is 12 mm and the radius of curvature of the profiles of the raceways and the rollers is 500 mm (R). Thus, in this example, R at 500 mm is ten times the value of 50 mm for r. R must be at least 2.5 times r, because smaller values will result in too large an inclination angle. As has been previously stated, when R is more than 20 times r, the misalignment angle will be too small even for minimum friction conditions. Thus, it must be seen to that no flanges or other axial limitations at the outer and inner raceway obstruct the axial displaceability of the rollers, and further, the rollers must have a sufficiently great axial play in a possibly used cage 4 for guiding and separation of the rollers. Beside being axially displaced, the rollers are also inclined to a certain extent in relation to the raceways, but this inclination is immaterial if not hampered by e.g. flanges.

Inclination of the raceways gives some rollers a somewhat smaller radial play between the raceways, but this decrease in play is so small that it does not significantly influence the ability of permitting such inclination which may occur in normal bearing applications, i.e. about a single degree at the most.

If the axial displaceability and inclinability of the rollers and a possible cage is not prevented by e.g. flanges at the raceways, the raceways can be displaced axially in relation to each other an unlimited distance, whereby also the rollers and a possible cage are displaced axially. This means that a maximum number of rollers can be inserted into the bearing during mounting without the need for a special roller mounting opening in a bearing ring.

A consequence of this characteristic is that the bearing, similar to e.g. cylindrical bearings without ring flanges, lacks the ability to take up thrust loads.

There is illustrated in FIG. 2 another embodiment of roller bearing in accordance with the present invention.

In accordance with this embodiment, the inner ring 5 and the outer ring 6 of the bearing have raceways 5a and 6a respectively with concave profiles. The rollers 7 have convex profiles. Also this bearing may be provided with a roller cage, but a cage is omitted in the drawing for the sake of simplicity. Upon relative inclination $\gamma$ of the raceways of the bearing, the rollers are displaced axially, similar to what is the case in the embodiment according to FIG. 1. If the axial displaceability of the rollers is not limited by e.g. flanges at the raceways or by a cage, the inclination can proceed to an arbitrary angle $\gamma$ without the rollers being squeezed between the raceways. The play between the raceways for some rollers is increased during inclination of the raceways, but the increase is insignificant at the most common inclination angles. In a bearing in which the races are inclined, a maximum number of rollers can be inserted between the raceways without the need for a roller mounting opening. As the rollers are self-guided, no cage is needed for roller guidance. Loose distance elements can be used to prevent mutual roller contact. If a conventional cage is desired, assembly of the bearing can take place if the cage has detachable end rings or a segment cage is used. The same general limitations as to the substantial equality of the various radii designated as R should be employed in this embodiment. Likewise, the value for R should be at least 2.5 times the value of r, and preferably between 2.5 and 20 times.

As in the previous described embodiment, the configuration of the bearing to obtain minimum friction is in accordance with the following equation:

$$R = k\sqrt{\frac{r_m L_a^2}{D_w \cdot \gamma}}$$

wherein R is the radius of curvature of the raceways, $r_m$ is the radius of the bearing axis to the center of the roller, $L_a$ is the roller length, K is a constant of approximately 0.56, $D_w$ is the largest diameter of the roller and $\gamma$ is the angle of inclination.

For a bearing of this type, for a given misalignment angle $\gamma$, the roller to outer ring displacement $\Delta_o$ is equal to $$\frac{\gamma}{2}\left[R + r + \frac{D_w(R + r)}{2R - D_w}\right]$$

The displacement $\Delta_i$ of the rollers relative to the inner ring is equal to $$\frac{\gamma}{2}\left[R - r - \frac{D_w(R+r)}{2R - D_w}\right]$$

The axial displacement $\delta_a$ of one bearing ring in relation to the other ring causes displacement of the roller relative to either ring which is equal to $$\frac{\delta_a}{2}\left(1 + \frac{D_w}{2R - D_w}\right)$$

When the raceways of the bearing are axially displaced, the roller play between the raceways is decreased. The axial displacement can thus not proceed an unlimited distance. However, the bearing can be considered as freely movable axially within axial displacement distances which are usually occurring in normal applications, such as due to temperature dependent length variations in a shaft mounted in two bearings.

Since the rollers can move or adjust axially when the bearing experiences misalignment, this minimizes edge loading of the rollers.

While particular embodiments of the present invention have been illustrated and described herein, it is not intended to limit the invention and changes and modifications may be made therein within the scope of the following claims.

What is claimed is:

1. A roller bearing comprising an inner and outer raceway and a row of rollers (3, 7) arranged between and contacting the raceways, the axes of the rollers being substantially parallel to the axes of the raceways when the latter are coinciding, the rollers and both raceways having substantially equal curved longitudinal section profiles in which the curve radii are substantially greater than the greatest distance between the central axis of the bearing and the surface of the raceway of the ring whose center of curvature is closest to the axis of the bearing and wherein the rollers are axially movable between the raceways without being obstructed by axial limitations at the raceways or by limited axial cage play for permitting relative inclination and axial displaceability of the raceways being limited only by the rollers being squeezed radially between the raceways, said radius of curvature of the raceways are being defined by $$k\sqrt{\frac{r_m L_a^2}{D_w \cdot \gamma}}.$$

2. A roller bearing comprising inner and outer raceway means and a row of roller means (3, 7) arranged between and contacting the raceway means, the axes of the roller means being substantially parallel to the axes of the raceway means when the latter are coinciding, the radii of curvature of the roller means and raceway means being substantially equal and wherein the radii are at least 2.5 times greater than the greatest distance between the central axis of the bearing and the surface of the raceway means of the inner or outer raceway means whose center of curvature is closest to the axis of the bearing and the roller and raceway means are so constructed that the roller means are axially movable between the raceway means without being obstructed by axial limitations at the raceways means or by limited axial cage play for permitting relative inclination and axial displaceability of the raceways being limited only by the roller means being squeezed radially between the raceway means, and so that there will be lower friction losses at misalignment angles of one degree or less.

3. A roller bearing as claimed in claim 2, wherein the roller means are hour-glass shaped.

4. A roller bearing as claimed in claim 2, wherein the roller means are barrel shaped.

5. A roller bearing as claimed in claim 2, wherein the radii of curvature of the roller means and raceway means are from 2.5 to 20 times greater than the greatest distance between the central axis of the bearing and the surface of the raceway means of the inner or outer raceway means whose center of curvature is closest to the axis of the bearing.

* * * * *